United States Patent Office 3,419,663
Patented Dec. 31, 1968

3,419,663
METHOD FOR THE CONTROL OF INSECTS USING THIOALKYLPHENYL CARBAMATES
Edward D. Weil, Lewiston, and Hans L. Schlichting, Grand Island, N.Y., assignors to Hooker Chemical Corporation, Niagara Falls, N.Y., a corporation of New York
No Drawing. Original application Mar. 4, 1963, Ser. No. 262,376, now Patent No. 3,331,894, dated July 18, 1967. Divided and this application Dec. 1, 1966, Ser. No. 612,065
16 Claims. (Cl. 424—300)

ABSTRACT OF THE DISCLOSURE

There is provided a method for the control of insects, comprising applying to the locus of said insects an insecticidal amount of the compound

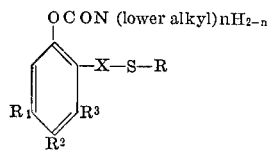

wherein:
(a) $n$ is an integer from 1 to 2;
(b) X is an alkylene group of from 2 to 8 carbon atoms;
(c) $R^1$, $R^2$, and $R^3$ are independently selected from the group consisting of hydrogen and lower alkyl;
(d) the sulfur atom is separated from the phenyl ring by at least two carbon atoms; and
(e) R is of 1 to about 20 carbon atoms and is selected from the group consisting of:
  (1) hydrocarbyl selected from the group consisting of alkyl, alkenyl, cycloalkyl, phenyl, naphthyl, alkylphenyl, benzyl, and arylalkyl; and
  (2) acyl selected from the group consisting of alkanoyl, benzoyl, thiobenzoyl, cyano, N-alkylcarbamyl, N,N-dialkylcarbamyl, n-alkylthiocarbamyl, N,N-dialkylthiocarbamyl, and O-alkylthiocarbonyl.

---

This is a division of application S.N. 262,376, filed Mar. 4, 1963, now U.S. Patent No. 3,331,894.

This invention relates to novel compositions of matter and to methods for pest control utilizing said compositions. More specifically, the invention relates to novel N-lower-alkyl-substituted carbamates of thioalkylphenols.

The novel compositions of the present invention are represented by the following formula

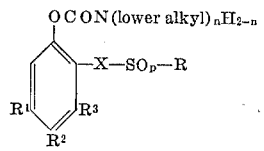

wherein the substituent X is a substituted or an unsubstituted alkylene radical having at least two carbon atoms, said alkylene radical preferably having from 3 to 8 carbon atoms, the sulfur atom attached to said alkylene radical being separated from the phenyl ring by at least two carbon atoms, preferably by 3 to 8 carbon atoms, $R^1$, $R^2$, and $R^3$ are substituents individually selected from the group consisting of hydrogen and lower alkyl radicals, R is a substituent selected from the group consisting of hydrocarbyl and acyl, $p$ is an integer from 0 to 2, inclusive, $p$ being 0 when R is acyl and $n$ is an integer from 1 to 2, inclusive, preferably 1.

The term "lower alkyl" is meant to encompass alkyl radicals having from 1 to about 6 carbon atoms, said radicals being branched or unbranched.

For reasons of cost and the like, the lower alkyl radical on the carbamate nitrogen is preferably methyl.

The term "acyl" as used herein refers to the radical obtained by removal of the —OH group from an acid.

The term "hydrocarbyl" as used herein represents the radical obtained by removal of the hydrogen atom from a hydrocarbon and thus encompasses alkyl, alkenyl, cycloalkyl, phenyl, naphthyl, alkylphenyl, benzyl, and other aryalkyl. The preferred hydrocarbyl radicals are those having from 1 to about 20 carbon atoms.

The alkylene group X may be unsubstituted or may be substituted by lower alkyl, hydrocarbyloxymethyl, hydrocarbylthiomethyl, hydrocarbyloxy, 2-(hydrocarbyloxy) ethyl, or 2-(hydrocarbylthio)ethyl.

The compositions of the present invention are useful for their insecticidal activity toward a large variety of insects (including mites) and against other invertebrate animal pests such as spiders, millipedes, slugs, and nematodes. The compositions of the invention also have unusual repellent properties toward various insects. Further, the compositions of the present invention have useful systemic properties in plants, i.e., the ability to translocate from the site of application to other parts of the plant where insects are located.

Illustrative examples of the X substituents include

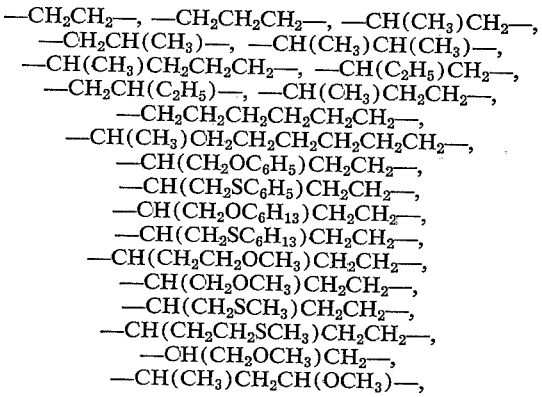

and the like.

Illustrative examples of the substituents $R^1$, $R^2$, and $R^3$ include hydrogen, methyl, ethyl, n-propyl, isopropyl, n-butyl, sec-butyl, isobutyl, tert-butyl, n-ampl, 1-methylbutyl, isamyl, tert-amyl, 1-ethylpropyl and hexyl. It is to be appreciated that the substituent X can be other lower lower alkyl groups without departing from the scope of the instant invention.

Illustrative examples of the R substituents include alkyl groups, such as methyl, ethyl, propyl, isopropyl, n-butyl, isobutyl, sec-butyl, tert-butyl, amyl, hexyl, cyclohexyl, octyl, nonyl, decyl, dodecyl, octadecyl, and eicosyl, also substituted alkyl such as allyl methoxyethyl, hydroxyethyl, chloropropyl. Further, the R substituent can be aryl, such as phenyl, tolyl, tert-butylphenyl, p-chlorophenyl, 2,4,5-trichlorophenyl, or arylalkyl such as benzyl, 2-phenylethyl, p-chlorobenzyl, o-methoxybenzyl, or acyl such as acetyl, propionyl, butyryl, benzoyl, thiobenzoyl, cyano, N - methylcarbamoyl, N - methylthiocarbamoyl, N,N-dimethylcarbamoyl, N,N-dimethylthiocarbamoyl, other N- and N,N-hydrocarbyl-substituted carbamoyl and thiocarbamoyl, dimethoxyphosphinyl, diethoxyphosphinyl, dimethoxythiophosphinyl, diethoxythiophosphinyl, other di- (lower alkoxy)-phosphinyl and -thiophosphinyl and O-alkyl-thiocarbonyl.

It is, of course, appreciated that the substituent X can be other hydrocarbyl and acyl groups without departing from the scope of the instant invention.

For reasons for high pesticidal activity and ease of manufacture by applicants' copending process of Ser. No. 262,375, filed Mar. 4, 1963, now Patent No. 3,336,393, certain species are preferred. The preferred group is encompassed by the formula:

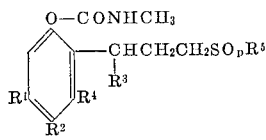

wherein the substituents $R^1$, $R^2$, and $R^3$ are as above defined, $R^4$ is a substituent selected from the group consisting of hydrogen, lower alkoxy-methyl, and 2-(lower-alkoxy)ethyl, and $R^5$ is a substituent selected from alkyl, phenyl, benzyl, acetyl, and di(lower alkoxy)thiophosphinyl, $p$ being an integer from 0 to 2 when $R^5$ is selected from phenyl, benzyl, and alkyl, and $p$ being 0 when $R^5$ is selected from acetyl and di(lower alkoxy)thiophosphinyl. The preferred alkyls, as already mentioned above, have from 1 to 20 carbon atoms.

Examples of compounds of this preferred group are those of the detailed examples given below as well as the following:

2-(3-methylthioproyl)-3-methyl-5-isopropylphenyl N-methyl carbamate;
2-(3-methylthiopropyl)-5-tert-butylphenyl N-methyl carbamate;
2-(3-methylthiopropyl)-5-(1-ethylbutyl)phenyl N-methyl carbamate;
2-(3-methylthiopropyl)-3,4,5-trimethylphenyl N-methyl carbamate;
2-(3-methylthio-1-[ethoxymethyl]propyl) phenyl N-methyl carbamate;
2-(3-methylthio-1-[hexyloxymethyl]propyl) phenyl N-methyl carbamate;
2-(3-isopropylthio-1-[2-butoxyethyl]propyl) phenyl N-methyl carbamate;
2-(3-octylsulfinylpropyl) phenyl N-methyl carbamate;
2-(3-octadecylsulfonylpropyl) phenyl N-methyl carbamate;
2-(3-diamyloxythiophosphinylthiopropyl) phenyl N-methyl carbamate; and
2-(3-phenylsulfonylpropyl)-4-methylphenyl N-methyl carbamate.

The N-methylcarbamates of the present invention are prepared from the corresponding phenols by (1) reaction with methyl isocyanate, (2) reaction with methylcarbamyl chloride (preferably in the presence of one molar equivalent of an HCl-acceptor such as caustic soda, triethylamine, or the like, or (3) reaction with phosgene to form the chloroformate, followed by reaction with methylamine to replace the chlorine atom.

The composition of the present invention wherein the integer $p$ is 1 or 2 may be thus made from the corresponding phenols, in which case no further reaction step is necessary, or may be made from the less oxidized phenol sulfide having a lower value of $p$, in which case the required additional oxygen atoms are replaced on the sulfur after carbamylation by subsequent oxidation by one or two molar equivalents (as required) of a suitable sulfide oxidizing agent, for example, hydrogen peroxide, peracetic acid, performic acid, perbenzoic acid, chromic acid, or molecular oxygen in the presence of a catalyst, (such as $N_2O_4$).

The compounds of the less preferred group, where $n$ is 2 and/or the lower alkyl group on the nitrogen is other than methyl, are prepared in analogous ways. For example, reaction of o-(3-methylthiopropyl) phenol with ethyl isocyanate yields the corresponding N-ethylcarbamate and reaction of this phenol with dimethylcarbamyl chloride in the presence of one molar equivalent of triethylamine gives the corresponding N,N-dimethylcarbamate.

While the compositions of the instant invention may be utilized as pesticides in the pure form, they may be conveniently employed in the form of formulations which, in many instances, enhance pesticidal activity. Suitable formulations include solutions of the pesticide composition in solvents such as petroleum hydrocarbons, e.g., xylene, heavy aromatic naphthalenes and the like, and aqueous dispersions or emulsions generally containing surface active agents such as those listed in "Soap and Chemical Specialties," volume 3, No. 7, pages 50–61, No. 8, pages 48–61. No. 9, pages 52–67, and No. 10, pages 38–67 (1955). Also useful are solid formulations of the compositions of the instant invention. For example, solid carriers such as talc, silica, clay vermiculite and the like may be utilized in the formulation. The solid formulations may also contain surface active agents, sticking agents, stabilizing agents, or binders to facilitate their application.

The composition of the present invention may further be formulated with other pesticides, for example, fungicides, such as sulfur, the fungicidal dithiocarbamates, dodecyl guanidine, nitropolychlorobenzenes and various fungicidal compositions containing chlorinated alkyl thio groups, such as captan, Further, the compositions of the present invention may be formulated with other insecticides and acaricides, such as DDT, lindane, methoxychlor, parathion, methyl parathion, malathion, sulfur, pyrethrins, bis(pentachlorocyclopentadienyl), other chlorinate insecticides, phosphate insecticides and the like.

Further, the compositions of the present invention may be formulated with synergists that serve to enhance the pesticidal activity, for example, piperonyl butoxide and the like. It is, of course, appreciated that any pesticidal composition may be used in combination with the compositions of the present invention which may serve to enhance, complement, or synergize said compositions.

The method of using these pesticides is to apply them to the locus of the pests to be controlled, preferably at rates of about 0.05 to 20 pounds of active ingredient per acre in the case of surface application to crops, or when admixed with a medium such as soil, water, or air, concentrations of 0.1 to 1,000 parts per million may be employed, depending on the nature of the pest involved, duration of pesticidal effect required, nature of the medium, and other factors, such as weather conditions.

In order that those skilled in the art may better understand the present invention and the manner in which it may be practiced, the following specific examples are given.

In the examples, specification and claims, all parts are by weight and all temperatures are in degrees centigrade, unless otherwise indicated.

EXAMPLE 1.—o-(3-methylthiopropyl)phenyl N-methylcarbamate

A mixture of 2.2 parts of o-(3-methylthiopropyl) phenol, prepared as described in applicants' application S.N. 262,375, now Patent No. 3,336,393 filed on even date herewith, 1 part of methyl isocyanate and 0.01 part of dibutyl tin dilaurate catalyst was allowed to stand at 35° C. for 5 hours, then stripped free of unreacted isocyanate by applying a vacuum of 0.1 millimeters of mercury pressure at 100 to 110° C. for 1 hour. The product was obtained as a residual oil, nearly colorless and moderately viscous, exhibiting the characteristic carbamate infrared absorption bands at 5.8 microns (carbonyl) and 3 microns (NH). On standing, the oil solidified to a crystalline solid, melting point 38 to 40° C., having the correct nitrogen analysis for $C_{12}H_{17}O_2NS$.

EXAMPLES.—2 to 27

Substantially the procedure of Example 1 was followed, with minor modifications in regard to temperature, time and use of solvent. In all cases, a catalytic amount, 0.1 to 1 percent, of dibutyl tin dilaurate was employed. The conditions of the reactions and the properties of the products obtained thereby are presented in the following tables.

| Example No. | Phenol used (parts by weight) | $CH_3NCO$ used (parts by weight) | Reaction temp., °C. | Reaction time (hr.) | Description (and parts by wt.) of N-methylcarbamate obtained | Empirical formula | Analysis N calcd. | Analysis N found |
|---|---|---|---|---|---|---|---|---|
| 2 | o-(3-acetylthiopropyl) phenol (5.3). | 2 | Reflux | ¼ | Viscous straw-colored oil (6.7) | $C_{13}H_{17}O_3NS$ | 5.25 | 5.06 |
| 3 | o-(diethoxythiophosphinylthiopropyl)-phenol (5.25). | 2 | Reflux | ¾ | Viscous reddish oil (6.0) | $C_{15}H_{24}O_3NS_2$ | 3.72 | 3.2 |
| 4 | o-(3-ethylthiopropyl) phenol (5). | 2 | 40 | 18 | Clear nearly-colorless oil (5.5) | $C_{13}H_{19}O_2NS$ | 5.4 | 5.0 |
| 5 | o-(3-n-butylthiopropyl) phenol (5). | 2 | 40 | 18 | ...do... | $C_{15}H_{23}O_2NS$ | 4.97 | 4.71 |
| 6 | o-(3-tert-butylthiopropyl) phenol (5). | 2 | 40 | 18 | Colorless crystals, M.P. 67° (from hexane) (5.5). | $C_{15}H_{23}O_2NS$ | 4.97 | 5.17 |
| 7 | o-(3-n-octylthiopropyl) phenol (5). | 2 | 40 | 18 | Light amber oil (5.5) | $C_{19}H_{31}O_2NS$ | 4.56 | 4.00 |
| 8 | o-(3-benzylthiopropyl) phenol (5). | 2 | 40 | 18 | Clear viscous syrup (5) | $C_{18}H_{21}O_2NS$ | 4.44 | 4.12 |
| 9 | o-(3-dodecylthiopropyl) phenol (5). | 2 | 40 | 18 | Clear oil (5.2) | $C_{23}H_{39}O_2NS$ | 3.56 | 3.39 |
| 10 | o-(3-phenylthiopropyl) phenol (5). | 2 | 40 | 18 | Clear light amber syrup (5.5) | $C_{17}H_{19}O_2NS$ | 4.64 | 4.35 |
| 11 | o-(3-methylthiopropyl)-p-cresol (2.57). | 1.5 | 35 | 18 | Colorless crystals, M.P. 53.5-54.5° (from heptane-benzene) (2). | $C_{13}H_{19}O_2NS$ | 5.5 | 6.0 |
| 12 | 2,6-di(3-methylthiopropyl) phenol (4.5). | 2 | 30 | 18 | Colorless oil (5.3) | $C_{16}H_{25}O_2NS_2$ | 4.3 | 4.7 |
| 13 | o-(3-methylthiobutyl) phenol (2.2). | 1.5 | 30 | 18 | Colorless viscous syrup (2.5) | $C_{13}H_{19}O_2NS$ | 5.5 | 5.1 |
| 14 | o-(3-methylthiopropyl)-m-cresol (2). | 2 | 25 | 12 | ...do... | $C_{13}H_{19}O_2NS$ | 5.5 | 5.7 |
| 15 | 2-(3-methylthiopropyl)3,5-xylenol (1.7). | 2 | 25 | 12 | Colorless viscous syrup (2) | $C_{12}H_{16}O_2NSCl$ | 5.12 | 5.01 |
| 16 | 2-(3-methylthiopropyl)-4-chlorophenol (6). | 5 | 25 | 12 | Colorless crystals, M.P. 65–66° (from benzene-heptane) (5). | $C_{12}H_{16}O_2NSCl$ | 5.12 | 5.01 |
| 17 | 2-(3-methylthiopropyl)-3,5-diisopropylphenol (6). | 10 | 25 | 12 | Clear viscous syrup (7) | $C_{18}H_{29}O_2NS$ | 4.3 | 4.3 |
| 18 | o-(3-methylsulfinylpropyl) phenol (5.97). | 3 | 25 | 12 | Viscous tan $H_2O$-sol. syrup (7.5). | $C_{12}H_{17}O_3NS$ | 5.49 | 5.87 |
| 19 | o-(3-ethylsulfinylpropyl) phenol (4 plus 10 parts benzene). | 2 | 25 | 12 | Viscous colorless syrup (3.1) | $C_{13}H_{19}O_3NS$ | 5.21 | 4.92 |
| 20 | o-(3-n-butylsulfinylpropyl) phenol (3 plus 10 parts benzene). | 2 | 25 | 12 | ...do... | $C_{15}H_{23}O_3NS$ | 4.71 | 4.61 |
| 21 | o-(3-octylsulfinylpropyl) phenol (6.7 plus 50 parts benzene). | 1 | 25 | 12 | Viscous colorless syrup (6.8) | $C_{19}H_{31}O_3NS$ | 3.9 | 4.0 |
| 22 | 1-(3-phenylsulfinylpropyl) phenol (7.8 plus 5 parts benzene). | 1 | 25 | 12 | Viscous colorless syrup (8.8) | $C_{17}H_{19}O_3NS$ | 4.42 | 4.82 |
| 23 | o-(3-methylsulfonylpropyl) phenol (5 plus 10 parts benzene). | 3 | 25 | 12 | Brownish viscous syrup (5.9) | $C_{12}H_7O_4NS$ | 5.2 | 5.5 |
| 24 | o-(3-methylsulfinylpropyl)-p-cresol (10 plus 20 benzene). | 5 | 25 | 48 | Viscous yellowish syrup (10.5) | $C_{13}H_{19}O_3NS$ | 5.21 | 5.12 |
| 25 | o-(2-methylthiopropyl) phenol (7). | 5 | 25 | 12 | Viscous colorless syrup | $C_{12}H_{17}O_2NS$ | 5.81 | 5.71 |
| 26 | o-(1-methyl-7-methylthioheptyl) phenol (10). | 5 | 25 | 12 | ...do... | $C_{17}H_{27}O_2NS$ | 4.51 | 4.61 |
| 27 | o-(3-methylthio-1-[methoxymethyl]propyl) phenol (10). | 5 | 25 | 12 | Viscous amber syrup | $C_{14}H_{21}O_3NS$ | 4.9 | 4.5 |

EXAMPLE 28.—Miticidal activity

Bean plants (Tendergreen variety) infested with about 100 mites per leaf (adult two-spotted mites of Tetranychus spp.) were sprayed with 0.1 percent aqueous dispersions of the various test chemicals. After 24 hours, the percentage mite kill was observed, with the following results:

| Chemical: | Percent mite kill |
|---|---|
| o-(3-methylthiopropyl)phenyl N-methylcarbamate | [1] 100 |
| o-(3-methylthio-1-[methoxymethyl]propyl) phenyl N-methylcarbamate | 100 |
| o-(Diethoxythiophosphinylthiopropyl) phenyl N-methylcarbamate | 100 |
| o-(3-octylthiopropyl) phenyl N-methylcarbamate | 100 |
| o-(3-dodecylthiopropyl) phenyl N-methylcarbamate | 100 |
| o-(3-phenylthiopropyl) phenyl N-methylcarbamate | 95 |
| o-(3-acetylthiopropyl) phenyl N-methylcarbamate | 40 |
| o-(methylthio) phenyl N-methylcarbamate [2] | 0 |

[1] 82 at 0.01 percent.
[2] For comparison.

EXAMPLE 29.—Aphicidal activity

Nasturtium plants heavily infested with aphids (*Aphis fabae*) were sprayed with 0.1 percent aqueous dispersions of the various compounds. After 24 hours, the percentage kill was observed.

| Chemical: | Percent aphid kill |
|---|---|
| o-(3-methylthiopropyl)phenyl N-methylcarbamate | [1] 100 |
| 2-(3-methylthiopropyl)-p-cresyl N-methylcarbamate | 100 |
| o-(3-acetylthiopropyl)phenyl N-methylcarbamate | 100 |
| o-(3-methylthio-1-[2-methoxyethyl]propyl) phenyl N-methylcarbamate | 100 |
| o-(3-methylsulfinylpropyl)phenyl N-methylcarbamate | [1] 100 |
| o-(3-methylsulfonyl)phenyl N-methylcarbamate | [1] 100 |
| o-(3-diethoxythiophosphinylthiopropyl) phenyl N-methylcarbamate | 100 |

[1] Also 100 percent kill when same amount of chemical was dispersed in the soil in which the nasturtiums were rooted. (Systemic test.)

Even at 0.025 percent concentration o-(3-methylthiopropyl) phenyl N-methylcarbamate continued to give 100 percent kill, whereas o-(methylthio) phenyl N-methylcarbamate gave only 42 percent kill of *Aphis fabae*.

EXAMPLE 30.—Housefly control

Various compounds of the invention were sprayed as 1 percent, and 0.1 percent aqueous dispersions onto caged houseflies (*Musca domestica*). At 2 hours and 24 hours after spraying, the effect was observed, with the following results:

| Chemical | Observation* | At 1 percent | At 0.1 percent |
| --- | --- | --- | --- |
| o-(3-dimethoxythiophosphinylthiopropyl)phenyl N-methylcarbamate. | 2 hr. KD 24 hr. kill | 100 100 | 100 100 |
| o-(3-methylthiopropyl)phenyl N-methylcarbamate. | 2 hr. KD 24 hr. kill | 100 100 | 95 85 |
| o-(3-ethylthiopropyl)phenyl N-methylcarbamate. | 2 hr. KD 24 hr. kill | 100 100 | 65 100 |
| o-(3-n-butylthiopropyl)phenyl N-methylcarbamate. | 2 hr. KD 24 hr. kill | 100 100 | 95 95 |
| o-(3-n-octylthiopropyl) phenyl N-methylcarbamate. | 2 hr. KD 24 hr. kill | 100 100 | 35 60 |
| o-(3-phenylthiopropyl) phenyl N-methylcarbamate. | 2 hr. KD 24 hr. kill | 100 100 | 45 70 |
| o-(3-benzylthiopropyl) phenyl N-methylcarbamate. | 2 hr. KD 24 hr. kill | 100 100 | 85 90 |
| o-(3-tert-butylthiopropyl) phenyl N-methylcarbamate. | 2 hr. KD 24 hr. kill | 100 100 | 55 80 |
| 2-(3-methylthiopropyl) phenyl N-methylcarbamate. | 2 hr. KD 24 hr. kill | 75 85 | 0 75 |
| 2-(3-ethylsulfinylpropyl) phenyl N-methylcarbamate. | 2 hr. KD 24 hr. kill | 85 95 | 0 30 |
| 2-(3-methylthiopropyl)-3,5-dimethylphenyl N-methylcarbamate. | 2 hr. KD 24 hr. kill | 100 100 | 100 100 |

*KD = knock down.

The compositions of the invention also show repellency toward some insect species as demonstrated by the following example:

EXAMPLE 31.—Insect repellency

Leaves of bean plants infested with Mexican bean beetle larvae were sprayed with 0.1 percent aqueous dispersions of o-(3-butylthiopropyl) phenyl N-methylcarbamate and o-(3-phenylthiopropyl) phenyl N-methylcarbamate. Part of each plant was left unsprayed. After 24 hours, the plants were inspected. The larvae, mostly uninjured, were found to have migrated from the sprayed parts of the plants, leaving the sprayed leaf surfaces completely uneaten. Similar infested plants left unsprayed had their leaves almost entirely eaten by the larvae.

EXAMPLE 32

An emulsifiable concentrate was prepared by blending the following ingredients:

```
                                                Pounds
Carbamate product of Example 1 _____ 2.0
Emcol H300X¹ _____ 0.1
Emcol H500X¹ _____ 0.1
Xylene to total volume of 1 gallon.
```

¹ Commercial emulsifiers manufactured by Witco Chemical Company: blends of alkylaryl sulfonate salts with polyoxyethylene ethers.

This concentrate was emulsified with water prior to application to lima bean plants with aphid control.

EXAMPLE 33

A wettable powder formulation was prepared by blending and grinding together the following ingredients in a hammer mill:

```
                                                Pounds
Carbamate product of Example 2 _____ 1.00
Sorbit P (alkylarylsulfonate wetting agent) _____ 0.05
Maraperse N(lignin sulfonate dispersing agent) ___ 0.05
Microcel E (synthetic silicate carrier) _____ 0.90
```

The resultant powder was dispersed in water by gentle agitation before spraying onto cotton plants for general insect control.

We claim:
1. A method for the control of insects, comprising applying to the locus of said insects an insecticidal amount of

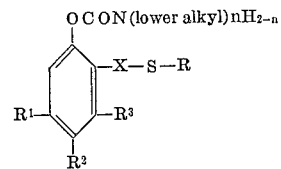

wherein:
(a) $n$ is an integer from 1 to 2;
(b) X is an alkylene group of from 2 to 8 carbon atoms;
(c) $R^1$, $R^2$, and $R^3$ are independently selected from the group consisting of hydrogen and lower alkyl;
(d) the sulfur atom is separated from the phenyl ring by at least two carbon atoms; and
(e) R is of 1 to about 20 carbon atoms and is selected from the group consisting of:
  (1) hydrocarbyl selected from the group consisting of alkyl, alkenyl, cycloalkyl, phenyl, naphthyl, alkylphenyl, benzyl, and arylalkyl; and
  (2) acyl selected from the group consisting of alkanoyl, benzoyl, thiobenzoyl, cyano, N-alkylcarbamyl, N,N - dialkylcarbamyl, N - alkylthiocarbamyl, N,N - dialkylthiocarbamyl, and O-alkyl-thiocarbonyl.

2. The method of claim 1 wherein X is methoxymethylpropyl and R is methyl.
3. The method of claim 1 wherein X is propyl and R is phenyl.
4. The method of claim 1, wherein
(a) X is an alkylene group of 3 to 8 carbon atoms;
(b) said sulfur atom is separated from the phenyl ring by at least 3 carbon atoms;
(c) said "(lower alkyl)$nH_{2-n}$" is $HCH_3$.
5. The method of claim 4, wherein X is of the formula

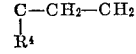

wherein $R^4$ is selected from the group consisting of hydrogen, lower alkyl, lower alkoxymethyl, and 2-(loweralkoxy) ethyl.
6. The method of claim 5, wherein R is an alkyl radical.
7. The method of claim 6, wherein $R^1$, $R^2$, and $R^3$ are hydrogen.
8. The method of claim 6, wherein X is propyl.
9. The method of claim 6, wherein R is methyl, X is propyl, and one of the $R^1$, $R^2$, and $R^3$ substituents is methyl, the other two being hydrogen.
10. The method of claim 8, wherein R is ethyl.
11. The method of claim 8, wherein R is n-butyl.
12. The method of claim 8, wherein R is octyl.
13. The method of claim 8, wherein R is dodecyl.
14. The method of claim 9, wherein $R^3$ is methyl.
15. The method of claim 9, wherein $R^2$ is methyl.
16. The method of claim 9, wherein $R^1$ is methyl.

References Cited

UNITED STATES PATENTS

| 2,929,833 | 3/1960 | Arloff et al. | 260—461 |
| 3,060,088 | 10/1962 | Kingsbury et al. | 167—53 |
| 3,094,457 | 6/1963 | Birum | 167—30 |

FOREIGN PATENTS 912,895   12/1962   Great Britain.

ALBERT T. MEYERS, *Primary Examiner.*

D. M. STEPHENS, *Assistant Examiner.*

U.S. Cl. X.R.

260—461